(12) United States Patent
Beals et al.

(10) Patent No.: US 9,536,569 B2
(45) Date of Patent: Jan. 3, 2017

(54) CONTENT-TRIGGERED HIGHLIGHT RECORDING

(71) Applicant: EchoStar Technologies L.L.C., Englewood, CO (US)

(72) Inventors: William Beals, Englewood, CO (US); Steven Michael Casagrande, Castle Pines, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 41 days.

(21) Appl. No.: 14/594,646

(22) Filed: Jan. 12, 2015

(65) Prior Publication Data

US 2016/0203843 A1   Jul. 14, 2016

(51) Int. Cl.
| | |
|---|---|
| G11B 27/10 | (2006.01) |
| G11B 27/28 | (2006.01) |
| G11B 27/34 | (2006.01) |
| G11B 31/00 | (2006.01) |
| H04N 5/76 | (2006.01) |
| H04N 5/775 | (2006.01) |

(52) U.S. Cl.
CPC ............ *G11B 27/105* (2013.01); *G11B 27/28* (2013.01); *G11B 27/34* (2013.01); *G11B 31/006* (2013.01); *H04N 5/7605* (2013.01); *H04N 5/775* (2013.01)

(58) Field of Classification Search
None
See application file for complete search history.

(56) References Cited

U.S. PATENT DOCUMENTS

| | | | | |
|---|---|---|---|---|
| 2007/0202822 A1* | 8/2007 | Sugihara | ................ | H04H 20/26 455/180.1 |
| 2013/0067491 A1* | 3/2013 | Rose | ................... | G06F 11/0766 719/318 |
| 2013/0108242 A1* | 5/2013 | Oliver | ................ | H04N 21/4334 386/244 |
| 2014/0240595 A1* | 8/2014 | DiNunzio | ............ | H03G 3/3005 348/484 |
| 2016/0057482 A1* | 2/2016 | Anderson | .......... | H04N 21/4334 386/296 |

* cited by examiner

*Primary Examiner* — Hung Dang
(74) *Attorney, Agent, or Firm* — Kilpatrick Townsend & Stockton LLP

(57) ABSTRACT

Systems and methods for selectively recording and bookmarking a portion of broadcast media content include receiving a video stream containing the broadcast media content, determining a video segment of the video stream to be output to a display device, and performing OCR on characters present within the video segment. The systems and methods may further include detecting a trigger event in the OCR of the video segment and creating a digital bookmark corresponding to the detected trigger event. The systems and methods may include generating a recording of a portion of the broadcast media content, whereby the recording begins prior to the trigger event and concludes after the trigger event, and storing the digital bookmark associated with the generated recording.

23 Claims, 7 Drawing Sheets

CONTENT-TRIGGERED HIGHLIGHT RECORDING

CROSS-REFERENCES TO RELATED APPLICATIONS

N/A

BACKGROUND

Digital video recording ("DVR") allows users to record television programs for viewing at a later time. Users may specify a broadcast channel and/or a broadcast time of the television program for DVR. During playback of the DVR, users may wish to skip forward to more desirable portions of the recorded television program. For example, users may wish to view only scoring plays in a recorded soccer match. In order to do so, users must manually browse or fast forward through the recording in order to locate and watch those particular segments. This manual process is cumbersome and time-consuming. There is a need for a more convenient and efficient approach for viewing specific portions of recorded media content. This application is intended to address such issues and provide related advantages.

SUMMARY

In general, the systems and methods disclosed herein are directed to recording media content, and more particularly, to selectively recording the media content based on one or more trigger events detected in the media content.

In one aspect, the present disclosure provides a method for selectively recording a portion of broadcast media content. The method may include receiving, by a television receiver, a video stream containing the broadcast media content, whereby the video stream may be received via a tuner of the television receiver. The method may include determining, by the television receiver, a video segment of the video stream to be output to a display device, and/or performing, by the television receiver, OCR on characters present within the video segment. Further, the method may include detecting, by the television receiver, a trigger event based on the OCR of the video segment, whereby the trigger event may include an identified change detected in the OCR of the video segment. The method may include, after detecting the trigger event, creating, by the television receiver, a digital bookmark corresponding to the trigger event being detected. Still, the method may include, in response to detecting the trigger event, generating, by the television receiver, a recording of a portion of the broadcast media content, whereby the recording of the portion of the broadcast media content may begin prior to the trigger event and may conclude after the trigger event. The method may include storing, by the television receiver, the digital bookmark associated with the generated recording.

Various embodiments of the present method may include one or more of the following features. The method may include determining, by the television receiver, an availability status of the tuner for receiving the video stream for OCR, and/or dedicating, by the television receiver, the tuner for receiving the video stream containing the broadcast media content for OCR. The method may include outputting, by the television receiver, the video segment at a monitoring location of a display screen on the display device. The method may include receiving, by the television receiver, user input for specifying a monitoring location of a display screen on the display device, and/or determining, by the television receiver, the video segment of the video stream for OCR based on the specified monitoring location.

In another example feature of the method, the video stream may include a sports competition, the video segment may include a score display, the characters may include a score of the sports competition, and/or the identified change may include a change in the score of the sports competition. The method may include distinguishing, by the television receiver, the score from other data in the video stream to determine the video segment, whereby the other data may include numerical values. In another example of the method, the other data may include at least one of a time remaining and a game interval of the sports competition.

Other features of the method may include continuously performing, by the television receiver, OCR on the characters present within the video segment at predetermined time intervals throughout a broadcast time of the broadcast media content. The method may include detecting, by the television receiver, a break in the video segment, whereby the break may include additional media content not desirable for monitoring, pausing, by the television receiver, the OCR on the video segment during the detected break, detecting, by the television receiver, an end of the break, and/or after determining the break has ended, resuming, by the television receiver, the OCR on the video segment. In one example of the method, the break in the video segment may include one or more commercial events. In another example of the method, detecting the break in the video segment may include determining, by the television receiver, a change in a content type of the video segment.

In another example feature, the method may include receiving, by the television receiver, user input for defining the trigger event to detect in the OCR of the video segment. The method may include receiving, by the television receiver, user input for selecting a category type of the broadcast media content for OCR, identifying, by the television receiver, that the video stream matches the selected category type, and/or monitoring, by the television receiver, the video stream for the user-defined trigger event. The method may include inserting, by the television receiver, the digital bookmark at a position in a file of the video stream, whereby the position may be based on a location of the detected trigger event in the file.

Still, other example features of the method may include receiving, by the television receiver, user input for selecting a first time duration for storing a buffer portion of the video stream prior to the detected trigger event, whereby a length of the buffer portion is based on the first time duration. The method may include receiving, by the television receiver, user input for selecting a second time duration for recording a trailing portion of the video stream immediately following the detected trigger event, whereby a length of the recorded trailing portion is based on the second time duration. The method may include recording, by the television receiver, the video stream for a duration of a broadcast time of the broadcast media content, and/or creating, by the television receiver, a plurality of digital bookmarks marking a plurality of trigger events detected in the recorded video stream. In another example, the method may include outputting, by the television receiver, a bookmark display for the digital bookmark on the display device, whereby the bookmark display may be configured to receive user input for selecting the digital bookmark and displaying the recording.

In another aspect, the present disclosure provides a computer-readable medium having stored thereon a series of instructions. When executed by a processor, the series of instructions may cause the processor to selectively record a portion of broadcast media content. The series of instructions may include receiving, by a television receiver, a video stream containing the broadcast media content, whereby the video stream may be received via a tuner of the television receiver, determining, by the television receiver, a video segment of the video stream to be output to a display device, and/or performing, by the television receiver, OCR on characters present within the video segment. The series of instructions may include detecting, by the television receiver, a trigger event based on the OCR of the video segment, whereby the trigger event may include an identified change detected in the OCR of the video segment. The series of instructions may include, after detecting the trigger event, creating, by the television receiver, a digital bookmark corresponding to the trigger event being detected. Still, the series of instructions may include, in response to detecting the trigger event, generating, by the television receiver, a recording of a portion of the broadcast media content, whereby the recording of the portion of the broadcast media content may begin prior to the trigger event and conclude after the trigger event. The series of instructions may include storing, by the television receiver, the digital bookmark associated with the generated recording.

In yet another aspect, the present disclosure provides a system for selectively recording a portion of broadcast media content. The system may include one or more processors and a memory communicatively coupled with and readable by the one or more processors. The memory may have stored therein processor-readable instructions that, when executed by the one or more processors, cause the one or more processor to receive, by a television receiver, a video stream containing the broadcast media content, whereby the video stream may be received via a tuner of the television receiver. The processor-readable instructions may cause the processor to determine, by the television receiver, a video segment of the video stream to be output to a display device, perform, by the television receiver, OCR on characters present within the video segment, and/or detect, by the television receiver, a trigger event based on the OCR of the video segment, whereby the trigger event may include an identified change detected in the OCR of the video segment. The processor-readable instructions may cause the processor to, after detecting the trigger event, create, by the television receiver, a digital bookmark for the video segment containing the trigger event, whereby the digital bookmark may correspond to the trigger event. Still, the processor-readable instructions may cause the processor to, after detecting the trigger event, generate, by the television receiver, a recording of a portion of the broadcast media content, whereby the recording may begin prior to the trigger event and may conclude after the trigger event. The processor-readable instructions may cause the processor to store, by the television receiver, the digital bookmark associated with the generated recording.

In another aspect, a method for bookmarking media content comprises determining, by a television receiver, a portion of the media content to monitor for a trigger event and/or monitoring, by the television receiver, the determined portion of the media content for the trigger event. The method may include detecting, by the television receiver, the trigger event in the media content, and/or after detecting the trigger event, creating, by the television receiver, a digital bookmark corresponding to the trigger event being detected.

Various embodiments of the method may include one or more of the following features. The determined portion of the media content to monitor may comprise closed-caption data of the media, and the trigger event may comprise one or more keywords detected in the closed-caption data. The determined portion of the media content to monitor may comprise a video segment of the media content being output to a display screen operatively connected to the television receiver, and/or detecting the trigger event may comprise detecting a change in the video segment based on an OCR of the video segment. The media content may comprise a pre-recorded media content. The digital bookmark may be added to a digital bookmarks file and point to a location of the trigger event in the pre-recorded media content. Further, after detecting the trigger event, the method may include creating, by the television receiver, a recording of the trigger event being detected, wherein the recording may begin prior to the trigger event and conclude after the trigger event.

Figure 1:
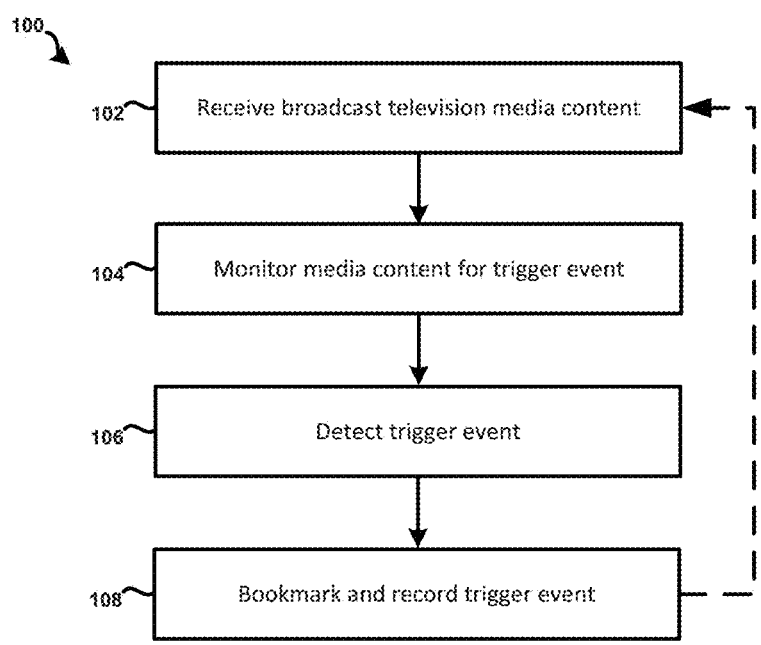
FIG. 1 shows an example method according to the present disclosure.

It is noted that any of the elements and/or steps provided in the block diagrams, flow diagrams, method diagrams, and other illustrations of the figures may be optional, replaced, and/or include additional components, such as combined and/or replaced with other elements and/or steps from other figures and text provided herein. Various embodiments of the present invention are discussed below, and various combinations or modifications thereof may be contemplated.

DETAILED DESCRIPTION

In general, the systems and methods disclosed herein provide for selective recording of media content, such as broadcast media content containing television programs that may be received at a television receiver. In one example, the television receiver, or any device implementing the systems and methods disclosed herein, may monitor a television program of the received media content for highlight events in the media content. Such highlight events may be user-defined and may generally include specific portions and/or scenes of the television program that are of particular interest to the user, e.g. scoring plays in a soccer, football, and/or baseball game being received by the television receiver. The systems and methods disclosed herein may monitor user-specified media content to detect such user-specified highlight events, also referred to as "trigger events," via optical character recognition ("OCR") of a portion of a display screen that might contain the trigger event, e.g. an upper or lower portion of the display screen where game scores are displayed. In another aspect, the systems and methods disclosed herein may detect such trigger events by monitoring closed caption data of the media content for the trigger events, e.g. detecting trigger-based words such as "Touchdown!" in closed captioning of the sports game being received at the television receiver.

Upon detection of a change in the score, the systems and methods disclosed herein may index the trigger event, e.g. scoring play, and/or initiate recording of the trigger event and any media content surrounding the event, while not recording and/or not indexing other non-trigger media content that may also be received at the television receiver. In this way, the user may quickly find such scoring plays while viewing a recording of the media content via DVR. It is noted that the systems and methods disclosed herein for content-trigger highlight recording may be applicable for any type of media content, and is not limited to sports broadcasts and/or television programs.

In another example, the systems and methods disclosed herein may provide for selective playback of a pre-recorded recording, or a recording that was previously made. For example, the systems and methods herein may bookmark and/or index various portions of the entire pre-recorded recording to allow a user to skip through the recording. In one example, the recording may include a soccer match. The user may watch the entire recorded soccer match and/or skip through the soccer match via bookmarks, which may be determined based on OCR of a score banner in the soccer match. In still another example, OCR of the score banner may permit the systems and methods disclosed herein to monitor for "close" trigger events, e.g. exciting portions of the media content leading up to any trigger events. Merely by way of example, the systems and methods disclosed herein may detect, based on OCR of the score banner, that the soccer match is tied with two minutes remaining. The systems and methods disclosed herein may bookmark this segment as an "interesting" segment. Such bookmarked segments may be any length as determined by the user, and/or stopped based on a change in the OCR, e.g. when the score is no longer tied and/or the game is over.

Various benefits offered by the systems and methods disclosed herein may be contemplated. The systems and methods may provide for a more convenient and efficient approach for viewing specific portions of recorded media content, and/or only recording specific portions of media content. Manual operation of locating and viewing media content may be eliminated and/or improved, e.g. less time-consuming and more user-friendly. For instance, users may skip ahead on relatively slow-moving or less interesting media content to a few user-selected, highlight events of the media content, which are recorded and/or stored, selectively, by the television receiver. It is contemplated that indexing, also referred to herein as bookmarking, may be automatic so that the user is not required to view remaining portions while skipping through a television program that is recorded on DVR. Merely by way of example above, the user may easily view three scoring plays in a DVR of a soccer game in less than a minute, while the soccer game footage may span hours of broadcast time. In another aspect, such improvements and benefits are attainable with the systems and methods disclosed herein without requiring further unique and/or enabling information to be sent with, or otherwise included within, the media content itself. Other examples and benefits are possible.

Turning now to FIG. 1, an example method 100 for content-triggered highlight recording is provided. The method 100 may be implemented by a television receiver, and/or any other device that may receive and/or record media content. Further, the method 100 shown, and any other methods disclosed herein, may include additional and/or alternative steps in relation to the steps being shown. Any of the steps may be optional, rearranged, and/or combined. Numerous variations are possible.

As shown in FIG. 1, the method 100 may include receiving media content, such as broadcast television media content (step 102). For example, the method 100 may include receiving, by a television receiver or any device capable thereof, a video stream containing the broadcast media content. Such video streams and/or broadcast media content may be transmitted from a service provider via satellite communication and may be received via one or more tuners of the television receiver. In an aspect, the tuners employed herein may be selected based on an availability status. For instance, the television receivers may determine the tuner as an idle tuner, which is available and/or not currently being utilized for other purposes. In some cases, the tuner may include a dedicated tuner that is designated, by the television receiver, for receiving media content to be implemented in the method 100. In another aspect, the media content is included in a video stream that is already being received at a tuner of the television receiver for other, additional purposes. Still, other examples are possible. Additionally and/or alternatively to live media content, bookmarks may be determined on pre-recorded media content.

It is contemplated that a number of tuners implemented for content-trigger highlight recording may be based on a number of television channels and/or programs to be monitored for selective recording. For instance, a plurality of tuners, which may include dedicated tuners, idle tuners, and/or a combination thereof, may be utilized concurrently for monitoring multiple different media content and/or television programs provided for in different video streams.

In another aspect, the media content received for selective recording may be selected or otherwise indicated by a user. The user may select, via a user interface provided for by the television receiver and/or other device in communication therewith, which media content, e.g. specific television program(s), to monitor for selective recording. For example, the method 100 may include receiving, by the television receiver, user input for selecting a category type of the broadcast media content. Such category types may include particular sports programs, global and/or local news broadcasts, television shows and/or episodes, movies, and any other types of broadcast television media content. In that case, the method 100 may further include identifying, by the television receiver, which video stream(s) carry the user-selected media content, e.g. which video stream matches the selected category type. Subsequently, the method 100 may include receiving and monitoring the identified video stream for the user-defined trigger event. In another aspect, a broadcast channel and/or broadcast time for particular television programs may be provided for by user selection, whereupon the television receiver may determine which video stream carries the content and/or schedule a tuner to receive that video stream during the broadcast time.

As further shown in FIG. 1, the method 100 may include monitoring the received media content for one or more trigger events (step 104). Monitoring may include optical character recognition ("OCR") being performed, by the television receiver, on at least a portion of the media content being received via the tuner and/or being output on a display device, e.g. a television screen. In some aspects, the television receiver may capture a screenshot of the display screen displaying the media content, and/or at least a portion thereof, intermittently and/or based on predetermined time intervals, and OCR the screenshot to identify any changes in the OCR that may indicate a trigger event. The television receiver may perform OCR on the screenshot of the entire display screen and/or a portion of the display screen, such as a monitoring location of the display screen that may be user-specified and/or automatically detected. For instance, the user may indicate an upper or lower area of a screen where a score is displayed, e.g. a score banner for a football game or soccer match, and designate that area as the monitoring location, such as an area of an image of the media content displayed on the screen, to be monitored and for OCR.

In another aspect, it is contemplated that such monitoring locations may be determined during an initial setup and/or upon selection of the media content to be recorded. For example, the television receiver may receive user input for identifying where the monitoring location, e.g. score display, is provided for on the television screen. The user may identify a general area, such as an upper, lower, right, and/or left quadrant of the screen, in which case the television receiver may further distinguish the content to be monitored in the particular quadrant from other content that is not relevant to the monitoring, e.g. distinguish between a time remaining and a score display occupying a same quadrant. In another aspect, the user may identify a particular location by highlighting or otherwise dragging a digital box around a portion of the display screen to indicate the monitoring location. Such actions may be performed via other computers and/or mobile devices that may receive user-input, and later sent to the television receiver as the monitoring location. In still other aspects, the monitoring location may be preprogrammed into, saved from previous selective recording entries, and/or otherwise known by, the television receiver, e.g. stored in a database having monitoring locations linked to certain media contents. In some aspects, the monitoring location may be translated into, by the television receiver, coordinates relating to a position on the display screen. Such coordinates may include cornerpoints of a rectangular box defining the monitoring location and/or a centerpoint of a geometric shape that generally captures the monitoring position. In yet another example, the television receiver may display a user interface comprising gridlines across the television screen such that a user may select a collection of small, rectangular boxes covering a portion of the desired monitoring location to indicate the monitoring location. Other examples are possible. For instance, the television receiver may identify the monitoring location of interest, such as a score banner, without receiving user input.

In still another aspect, the television receiver may determine a video segment of the received video stream to be output to the display device for OCR. Such video segments may include a portion of the video stream being output from a first point in time to a second point in time. The video segment may include a smaller area, e.g. the monitoring location, of images captured from the video stream where OCR is applied. In some examples, the video segment may be based on media content that is output within or at the coordinates of the monitoring location. It is contemplated that the television receiver may monitor and OCR characters in at least the monitoring location of the video segment for selective recording triggers. In other examples, the video segment and/or an entire screen being output via the display device may be monitored and/or OCR monitored for triggers. Such triggers may include, merely by way of example, changes in the OCR of characters in the video segment and/or monitoring location, e.g. a score change.

In other examples, the method 100 may include monitoring closed captioning data of the media content. Such closed captioning data may be displayed on the television screen for OCR monitoring and/or otherwise inspected by the television receiver, e.g. in the video stream, for trigger events. For instance, the television receiver may receive user input for defining one or more trigger events, such as a keyword or phrase being detected in the closed captioning. For example, the trigger event may include "Colorado" for a news broadcast, or any other user-defined words and/or phrases. In another aspect, a recurrence of a word or phrase for any number of times may be considered in the trigger event. In yet another aspect, a spacing of a word or phrase from other words or phrases may be contemplated as defining trigger events. For instance, the trigger event may include "Denver" and "Broncos" in the same sentence, or closely followed by one another. Other examples are possible.

Further shown in FIG. 1, the method 100 may include detecting one or more trigger events (step 106). In one example, the television receiver may detect a trigger event based on the OCR of the video segment, whereby the trigger event includes an identified change detected in the OCR of the video segment. For example, the television receiver may continuously perform OCR on the characters present within the video segment at predetermined time intervals throughout a broadcast time of the broadcast media content. In another aspect, closed-caption monitoring for trigger event(s) may be live and real-time as the media content is received via the tuner. It is contemplated that the trigger event(s) may be determined by user input, and that a plurality of trigger events may be defined for a particular television program. Further, different trigger events may be grouped together into categories, e.g. scoring plays, commentary scenes, scenes featuring certain players, and the like, so that a user may easily select a category of trigger events to view.

Still further shown in FIG. 1, the method 100 may include bookmarking and/or recording the one or more detected trigger events (step 108). In one example, after detecting the trigger event, the television receiver may create a digital bookmark corresponding to the trigger event being detected. Merely by way of example, the television receiver may locate a position of the trigger event in a file of the video stream. Such positions may be determined by comparing a byte count at a time the trigger event is detected to a known file size of the media content to find a location of the trigger event. The digital bookmark may be inserted at the determined location corresponding to the trigger event.

In other examples, the digital bookmark may be placed before and/or after the trigger event. For instance, in response to detecting the trigger event, the television receiver may generate a recording of a portion of the broadcast media content that begins prior to the trigger event and/or concludes after the trigger event. The digital bookmark may be inserted at a position corresponding a buffer portion which precedes the trigger event, at the trigger event, and/or in a trailing portion which follows the trigger event. In that case, the television receiver may receive, during an initial setup and/or upon selection of the media content to be recorded, a first time duration for storing a buffer portion of the video stream prior to the detected trigger event. A length of the buffer portion may be based on a first time duration, which may be specified by the user and/or predetermined. In another aspect, the television receiver may receive user input for selecting a second time duration for recording a trailing portion of the video stream immediately following the detected trigger event. A length of the recorded trailing portion is based on the second time duration. It is contemplated that upon detecting the trigger event, locations of buffer portion, trigger event, and/or trailing portion may be determined by the television receiver and indexed with a digital bookmark. It is noted that in some embodiments, the digital bookmark is added to a separate bookmarks file that references the bookmarked locations, e.g. trigger events, in a main A/V file. The separate bookmarks file may comprise an index to the main A/V file that is much smaller than the main A/V file, e.g. the recorded and/or pre-recorded file containing the media content.

Along with bookmarking, the television receiver may store the trigger event, a portion of the buffer segment defined by the first time duration, and/or a portion of the trailing segment of the video stream defined by the second time duration. Such stored media content may be viewed at a later time upon user selection. For instance, the digital bookmarks may be output for display to and selection by the user, whereby the user may select which bookmarks to view, which category of bookmarks to view, and/or view all bookmarked content in the chronological order that they were recorded. The television receiver may provide a bookmarks display for the digital bookmark on the display device. The bookmarks display may be configured to receive user input for selecting the digital bookmark and displaying the recording. In another aspect, the user may skip from one bookmark to another bookmark by pressing a button on a controller of television receiver. Other examples are possible.

In this way, highlight events may be recorded with an ability to only view content surrounding highlight or other anchor events. The method 100 may permit tagging of more interesting scenes of media content for recording, and/or permit tagging interesting scenes of a media content that is recorded entirely. For instance, the user may specify a television program for DVR, and the method 100 may bookmark the detected trigger events to provide the user an option of viewing and/or skipping to only the bookmarked contents if desired. Other examples are possible. Further, the method 100 may monitor a plurality of channels in a same video stream, and/or monitor a plurality of channels in different video streams that are received via different tuners, concurrently or otherwise.

It is noted that the method 100 and/or any of the systems and methods disclosed herein may include other steps not explicitly shown. For instance, if the media content designated for selective recording is currently being output via the display device, the television receiver may display an icon or overlay on a small portion of the display screen to indicate that the content is currently being monitored for content-trigger highlight recording, and/or is currently being recorded, bookmarked, and/or otherwise stored, and so on. Such icons may change color or context to indicate different phases of the method 100. For instance, the icon may blink and/or emit a red color during a recording phase, and appear solid and/or emit a green, black, or white color during a monitoring phase. Further, such icons may be selected to open the bookmarks display window on the display screen.

In another aspect, the method 100 may include detecting, by the television receiver, a break in the video segment. Such breaks may include additional media content that is not desirable for monitoring, for example, commercial breaks. In that case, the method 100 may further include pausing, by the television receiver, the OCR on the video segment during the detected break. Upon detecting and determining, by the television receiver, an end of the break, the television receiver may resume the OCR on the video segment. Breaks in the video segment may be user-determined and/or detected based on a change in content type of the video segment. For example, characters normally present in the video segment, e.g. score display, may be absent during the break. In another aspect, such breaks may be indicated in the video streams itself by flags and/or metadata originally provided with the video stream. It is noted that pausing the OCR may include detecting that a score display and/or time remaining, or other video segment containing the monitoring location, has left the display screen. In that case, the television receiver may temporarily stop recording and/or stop creating bookmarks.

In still other examples, a bookmarked portion of the video segment may include a plurality of bookmarks. For instance, the television receiver may record a trailing portion of a first trigger event and continue monitoring the video segment, whereupon a second trigger event may be detected in the recorded trailing portion. In that case, the television receiver may create an additional bookmark marking that second trigger event, and extend the recording through a second trailing portion that immediately follows the second trigger event. In that case, the recorded video segment may comprise a longer video segment having multiple bookmarks. It is noted that in some cases, a bookmarks table containing a plurality of bookmarks pointing to locations of trigger events in a recording may be provided. In other cases, a plurality of smaller recordings containing a plurality of trigger events may be provided, along with a bookmarks table having bookmarks that points to each of the plurality of smaller recordings.

In a particular example of method 100, the video stream may include a sports competition being received via the tuner of the television receiver. The video segment being monitored and OCR may include the score display showing a score of the sports competition. The trigger event may include an identified change in the OCR of the video segment, whereby the identified change is a change in the OCR of the characters, e.g. a change in the score of the sports competition. In some cases, the television receiver may distinguish the score from other data in the video stream to determine the video segment to OCR during the broadcast timeslot. Such other data may include other numerical values, such as a time remaining and/or a game interval of the sports competition. In some cases, the video segment need only be determined once for a particular media content. In other cases, the video segment and/or monitoring location may be dynamic such that the television receiver periodically checks if the monitoring location should be elsewhere on the display screen.

Figure 2:
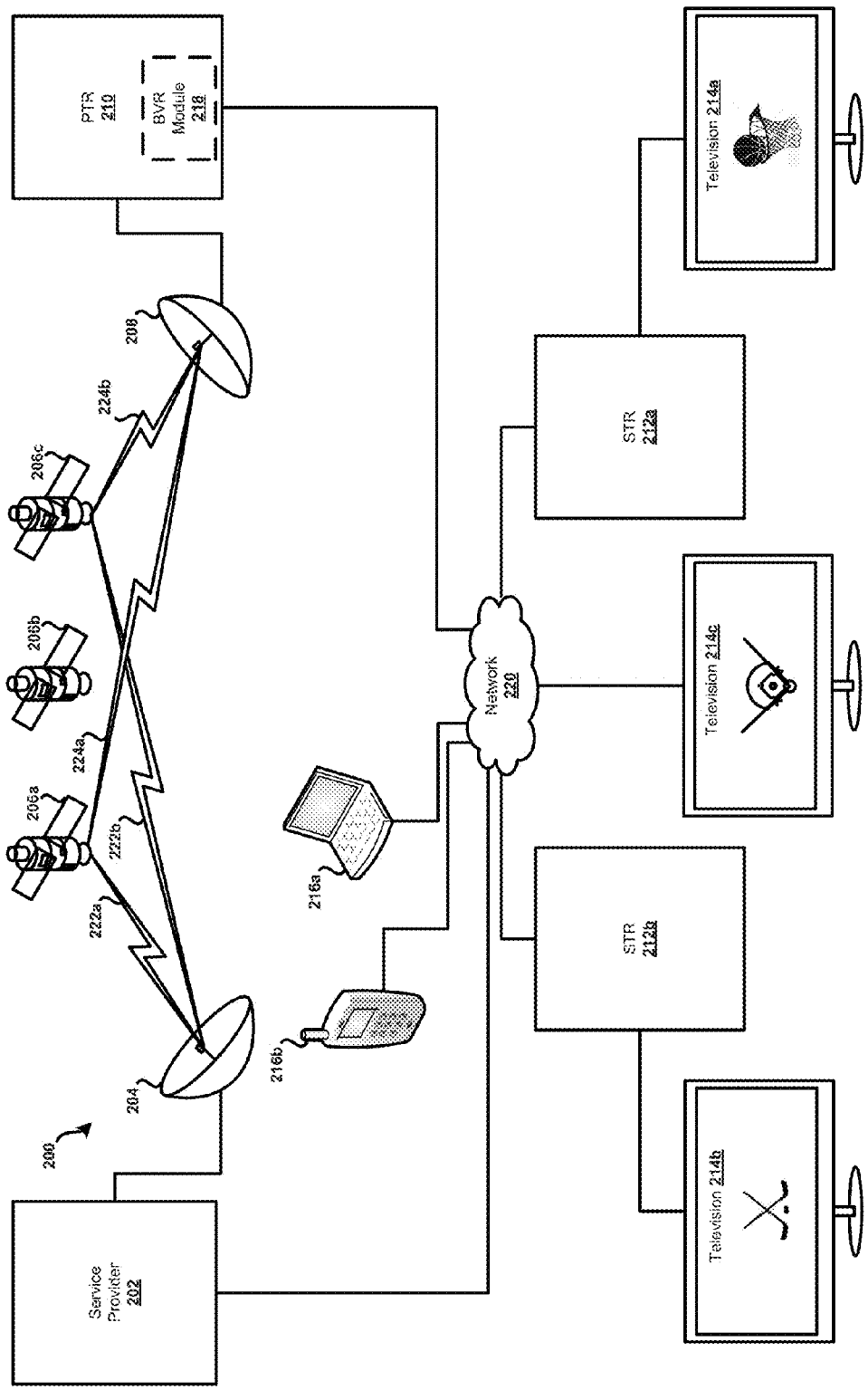
FIG. 2 shows an example satellite system according to the present disclosure.

Turning now to FIG. 2, an example satellite system 200 is shown in accordance with the present disclosure. For brevity, the satellite system 200 is depicted in a simplified form, and may generally include more or fewer systems, devices, networks, and/or other components as desired. Further, number and type of features or elements incorporated within the satellite system 200 may or may not be implementation-specific, and at least some of the aspects of the satellite system 200 may be similar to a cable television distribution system, an IPTV (Internet Protocol Television) content distribution system, and/or any other type of content distribution system.

In this example, the satellite system 200 may include a service provider 202, a satellite uplink 204, a plurality of orbiting (e.g., geosynchronous) satellites 206a-c, a satellite dish 208, a PTR (Primary Television Receiver) 210, a plurality of STRs (Secondary Television Receivers) 212a-b, a plurality of televisions 214a-c, and a plurality of computing devices 216a-b. The PTR 210 and/or any of the STRs 212a-b may include a bookmark video recording ("BVR") module 218 that is programmatically configured to selectively record a portion of broadcast media content based on a trigger event identified in an OCR of the broadcast media content. As discussed throughout, the BVR module 218 may be provided according to a particular hardware and/or firmware architecture of the PTR 210. Such implementations may be beneficial and/or advantageous in many respects, as described further in the succeeding paragraphs. In another aspect, the satellite system 200 may include one or more headless gateways, which may comprise a type of PTR 210 that does not have display outputs. In some cases, such headless gateways may include the BVR module 218.

The satellite system 200 may also include at least one network 220 that establishes a bidirectional communication path for data transfer between and among each respective element of the satellite system 200 outside of the unidirectional satellite signaling path. The network 220 is intended to represent any number of terrestrial and/or non-terrestrial network features or elements. For example, the network 220 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the satellite system 200.

The PTR 210, and the STRs 212a-b, as described throughout may generally be any type of television receiver, television converter, etc., such as a STB (Set-Top-Box) for example. In another example, the PTR 210, and the STRs 212a-b, may exhibit functionality integrated as part of or into a television, a DVR, a computer such as a tablet computing device, or any other computing system or device, as well as variations thereof. Further, the PTR 210 and the network 220, together with the STRs 212a-b and televisions 214a-c, and possibly the computing devices 216a-b, may be incorporated within or form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example satellite system 200 may be configured to communicate in accordance with the MoCA® (Multimedia over Coax Alliance) home entertainment networking standard. Still other examples are possible.

In practice, the satellites 206a-c may each be configured to receive uplink signals 222a-b from the satellite uplink 204. In this example, the uplink signals 222a-b may contain one or more transponder streams of particular data or content, such as particular television channel, that is supplied by the service provider 202. For example, each of the respective uplink signals 222a-b may contain various media content such as a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c. Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc.

The satellites 206a-c may further be configured to relay the uplink signals 222a-b to the satellite dish 208 as downlink signals 224a-b. Similar to the uplink signals 222a-b, each of the downlink signals 224a-b may contain one or more transponder streams of particular data or content, such as various encoded and/or at least partially electronically scrambled television channels, on-demand programming, etc., in accordance with an allotted carrier frequency and bandwidth. The downlink signals 224a-b, however, may not necessarily contain the same or similar content as a corresponding one of the uplink signals 222a-b. For example, the uplink signal 222a may include a first transponder stream containing at least a first group or grouping of television channels, and the downlink signal 224a may include a second transponder stream containing at least a second, different group or grouping of television channels. In other examples, the first and second group of television channels may have one or more television channels in common. In sum, there may be varying degrees of correlation between the uplink signals 222a-b and the downlink signals 224a-b, both in terms of content and underlying characteristics.

Continuing with the example implementation-specific scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 224a-b, from one or more of the satellites 206a-c. Based on the characteristics of the PTR 210 and/or satellite dish 208, however, it may only be possible to capture transponder streams from a limited number of transponders concurrently. For example, a tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. In this example, the HD channel may be output to the television 214c in accordance with the HDMI/HDCP content protection technologies. Other examples are possible.

Further, the PTR 210 may select via tuner, decode, and relay particular transponder streams to one or both of the STRs 212a-b, which may in turn relay particular transponder streams to a corresponding one of the television 214a and the television 214b for display thereon. For example, the satellite dish 208 and the PTR 210 may, respectively, be configured to receive, decode, and relay at least one television channel to the television 214a by way of the STR 212a.

Similar to the above-example, the television channel may generally be presented live, or from a recording as previously stored on the PTR 210, and may be output to the television 214a by way of STR 212a in accordance with a particular content protection technology and/or networking standard. Still further, the satellite dish 208 and the PTR 210 may, respectively, be configured to receive, decode, and relay at least one premium television channel to one or both of the computing devices 216a-b. Similar to the above-examples, the television channel may generally be presented live, or from a recording as previously stored on the PTR 210, and may be output to one or both of the computing devices 216a-b in accordance with a particular content protection technology and/or networking standard.

Figure 3:
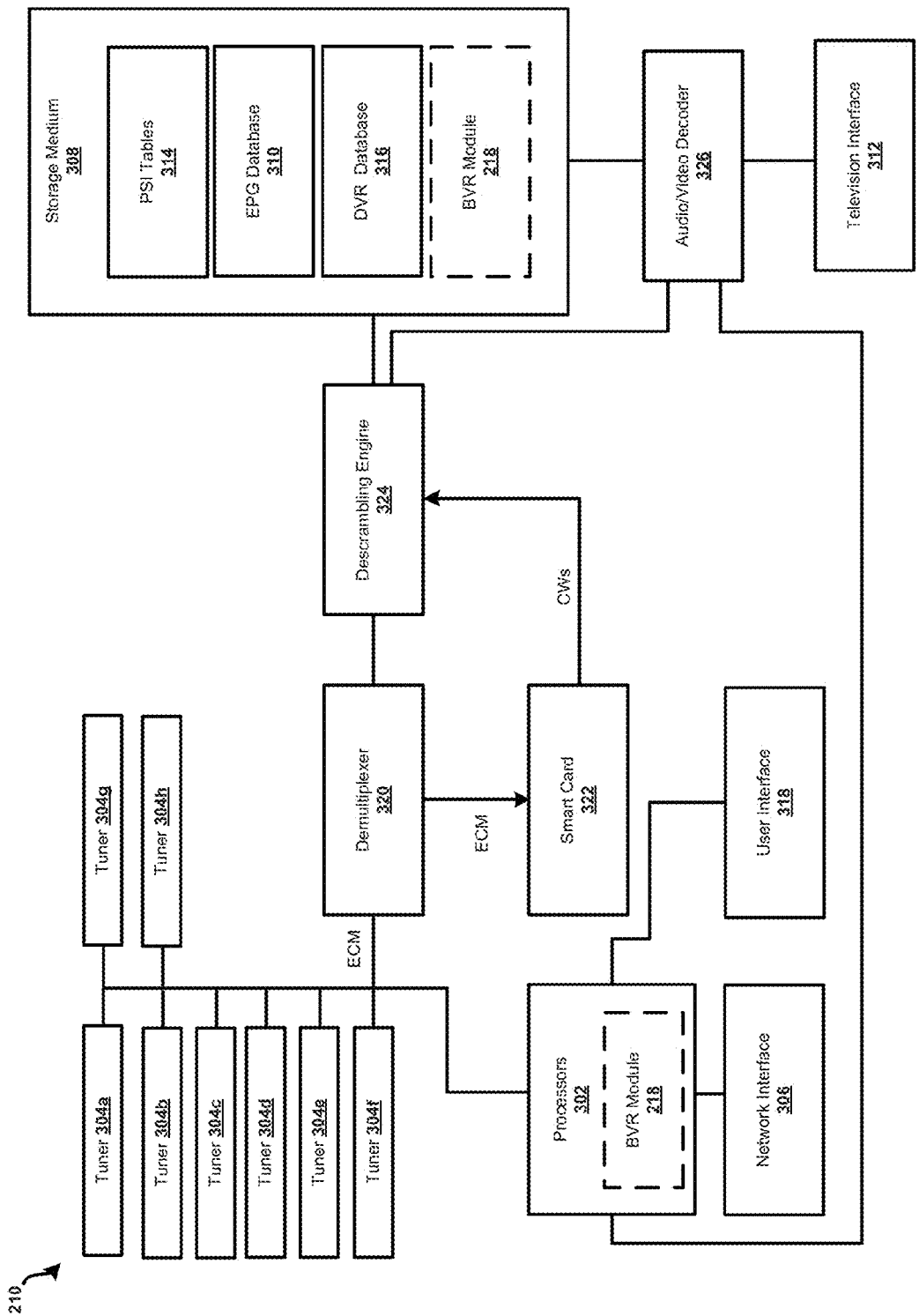
FIG. 3 shows an example block diagram for a television receiver according to the present disclosure.

Referring now to FIG. 3, an example block diagram of the PTR 210 of FIG. 2 is shown in accordance with the present disclosure. In some examples, at least one of the STRs 212a-b may be configured in a manner similar to that of the PTR 210. In other examples, at least one of the STRs 212a-b may be configured to exhibit a reduced functionality as compared to the PTR 210, and may depend at least to a certain degree on the PTR 210 to implement certain features or functionality. In this example, the STRs 212a-b may be referred to as a "thin client." It is noted that the STRs may be optional, and not necessarily required for the systems and methods disclosed herein.

For brevity, the PTR 210 is depicted in a simplified form, and may generally include more or fewer elements or components as desired in accordance with the present disclosure. For example, the PTR 210 is shown in FIG. 3 to include the BVR module 218. In general, and as discussed in further detail below, the BVR module 218 may be configured to provide for one or more aspects of content-triggered highlight recording. Other examples are possible as well.

Referring still to FIG. 3, the PTR 210 in this example includes one or more processors 302, a plurality of tuners 304a-h, at least one network interface 306, at least one non-transitory computer-readable storage medium 308, at least one EPG database 310, at least one television interface 312, at least one PSI (Program Specific Information) table 314, at least one DVR database 316, at least one user interface 318, at least one demultiplexer 320, at least one smart card 322, at least one descrambling engine 324, and at least one decoder 326. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation. Alternatively to the PTR 210 having a plurality of tuners, the systems and methods disclosed herein may be provided for with a PTR having a single tuner only.

The processors 302 may include one or more specialized and/or general-purpose processors configured to perform processes such as instructing tuners to tune to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-h may be used to tune to television channels, such as television channels transmitted via satellites (not shown). Each one of the tuners 304a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, twelve tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites, which may be unidirectional to the PTR 210, and another communication channel between the service provider 202 and the PTR 210, which may be bidirectional, may be via a network, such as various wireless and/or hardwired packet-based communication networks, including, for example, a WAN (Wide Area Network), a HAN (Home Area Network), a LAN (Local Area Network), a WLAN (Wireless Local Area Network), the Internet, a cellular network, a home automation network, or any other type of communication network configured such that data may be transferred between and among respective elements of the satellite system 200. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the BVR module 218 mentioned above. Recorded television programs may be stored using the storage medium 308.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites. For example, updates to the EPG database 310 may be received periodically via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example, eight television channels may be decoded concurrently or simultaneously.

The television interface 312 outputs a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304*a-h* and/or may be received via the network interface 306 over the network from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), a PMT (Program Management Table), etc.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more viewers or users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304*a-h*, television channels received via satellite may contain at least some encrypted or scrambled data. Packets of audio and video may be scrambled to prevent unauthorized users, such as nonsubscribers, from receiving television programming without paying the service provider 202. When one of the tuners 304*a-h* is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Conditional Access) which performs decryption of ECM to obtain control words that are used to descramble video and/or audio of television channels. Decryption of an ECM may only be possible when the user, e.g., an individual who is associated with the PTR 210, has authorization to access the particular television channel associated with the ECM. When an ECM is received by the demultiplexer 320 and the ECM is determined to correspond to a television channel being stored and/or displayed, the ECM may be provided to the smart card 322 for decryption.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304*a-h* may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

For brevity, the PTR 210 is depicted in a simplified form, and may generally include more or fewer elements or components as desired, including those configured and/or arranged for implementing various features associated with intelligently allocating idle tuner resources to buffer or record broadcast programming determined as desirable, as discussed in the context of the present disclosure. For example, the PTR 210 is shown in FIG. 3 to include the BVR module 218 as mentioned above in connection with FIG. 2. Further, some routing between the various modules of the PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television streaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
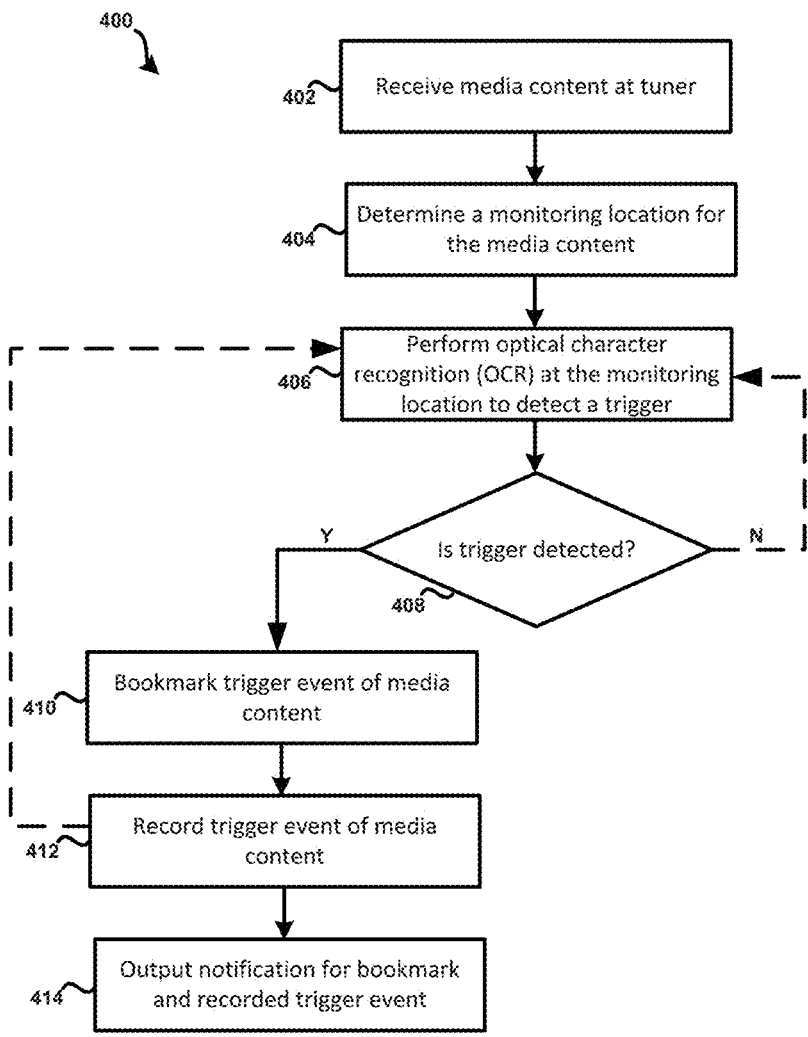
FIG. 4 shows another example method using optical character recognition ("OCR") according to the present disclosure.

Turning now to FIG. 4, an example method 400 for selective recording of a portion of media content with optical character recognition ("OCR") is shown according to various embodiments disclosed herein. The method 400 may be implemented by a television receiver, such as the television receiver 210 having the BVR module 218 as shown in FIGS. 2 and 3, or any other device that may receive and/or record media content. It is contemplated that the method 400 may include any additional steps, and that the steps being shown may be rearranged in any manner and/or may be optional.

As shown in FIG. 4, the method 400 may include receiving media content, e.g. video stream, at a tuner of the television receiver (step 402). The method 400 may include determining a monitoring location for the media content, e.g. determining a video segment of the media content that corresponds to an area in images of the video stream that is output for display to a display device (step 404). Such images may be captured periodically by screenshots taken by the television receiver. Further, the video segment may be based on user-input and/or a database of known monitoring locations based on the nature of the media content.

Further, the method 400 may include performing OCR at the monitoring location, e.g. the determined video segment, to identify or detect a trigger event (step 406). Such trigger event(s) may be user-defined and/or based on a database of known trigger events based on the nature of the media content, e.g. changes in a score for a sports competition. It is contemplated that the OCR may be performed continuously in various time intervals throughout a broadcast time of the media content being monitored. Merely by way of example, the television receiver may perform OCR on the video segment once every fifteen seconds. In other examples, the television receiver may OCR the video segment once every second, every $\frac{1}{60}^{th}$ of a second, and/or on each frame containing the video segment. Other variations are possible.

The method 400 may include determining whether a trigger event is detected (step 408). If a trigger event is not detected, the method 400 may continue monitoring the media content. If a trigger event is detected, the method 400 may also continue monitoring the media content, while bookmarking the detected trigger event (step 410). In that case, the method 400 may include inserting a digital bookmark in a file of the received media content, and/or inserting the bookmark to a smaller, secondary bookmarks file that indexes and points to a first A/V, larger file containing the recorded media content. Further, the method 400 may include recording the trigger event of the media content (step 412). As discussed previously, recording the trigger event may include creating a recording that comprises a buffer portion immediately preceding the trigger event, and continuing recording of a trailing portion of the video stream that immediately follows the trigger event. In this way, it is contemplated that a scoring play and any replays or commentary regarding the scoring play may be recorded and bookmarked. Lengths of such recordings may be user-defined and/or set by default. Merely by way of example, the user may select a first time duration that defines lengths of buffer portions for 15 seconds, and a second time duration that defines lengths of trailing portions for 20 seconds. The method 400 may further include outputting a notification to the user that an event has been bookmarked and/or recorded. In some aspects, the notification may comprise an icon or a change thereof to indicate bookmarking of the event. In other aspects, the notification may comprise sending, by the television receiver, the user's mobile device an update that a trigger event occurred and has been bookmarked and/or recorded. In still other aspects, the bookmarks may be accessed via a bookmarks display window on the display screen, which might appear in response to the user selecting a button on the screen and/or pressing a button on a remote control.

Figure 5:
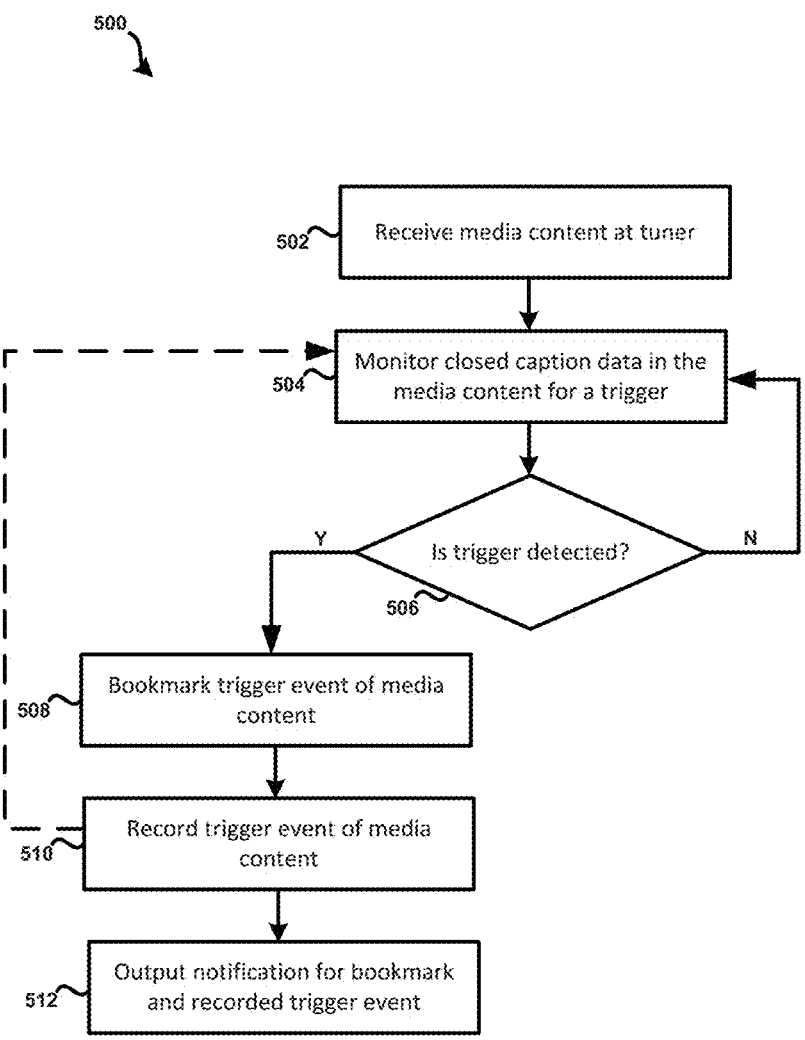
FIG. 5 shows yet another example method using closed caption data according to the present disclosure.

Referring now to FIG. 5, an example method 500 for selective recording of a portion of media content using closed caption data is shown according to various embodiments disclosed herein is shown. The method 500 may be implemented by a television receiver, such as the television receiver 210 having the BVR module 218 as shown in FIGS. 2 and 3, or any other device that may receive and/or record media content. It is contemplated that the method 500 may include any additional steps, and that the steps being shown may be rearranged in any manner and/or may be optional.

The method 500 may include receiving media content at a tuner of the television receiver (step 502). It is contemplated that media content may be received in other ways, for instance via internet connections and otherwise. The method 500 may include monitoring the closed caption data in the media content for a trigger event (step 504). Such trigger events may include words and/or phrases, and/or spacing of such words/phrases, repetition of such words/phrases, and/or a time of day coinciding with detection of the words and/or phrases in the closed caption data. Upon detection of a trigger event in the closed caption data, the method 500 may include bookmarking the trigger event of the media content (step 508) by inserting a digital bookmark in a file stream corresponding to the trigger event. Further, the method 500 may include recording the trigger event (step 510), along with any buffer and/or trailing portions of the video stream surrounding the trigger event, if desired by the user. Further, the method may include outputting a notification to notify the user of the bookmark and/or recording (step 512). It is contemplated that such steps 508-512 may include any of the features described previously, such as in FIG. 4.

It is further noted that the method 500, and/or any features disclosed herein, may be user-configurable and support multiple languages as determined by user location, the media content being received, and/or by the user. The television receiver may further translate key words and/or phrases of a trigger event into different languages to monitor other various types of media content. For instance, a user may instruct the television receiver to monitor all news channels for a time slot from 6-8 pm for any discussion on "baseball". The television receiver may translate the word "baseball" from English to Spanish if there are any Spanish news channels being received. Further, it is contemplated that the television receiver may include a database of synonyms, suggested words, and/or related words to detect during monitoring. Upon user entry of words defining a trigger event, the television receiver may indicate any synonyms, suggested words, and/or related words taken from the database for user selection as additional trigger events to enhance the capture of any highlight events.

Figure 6:
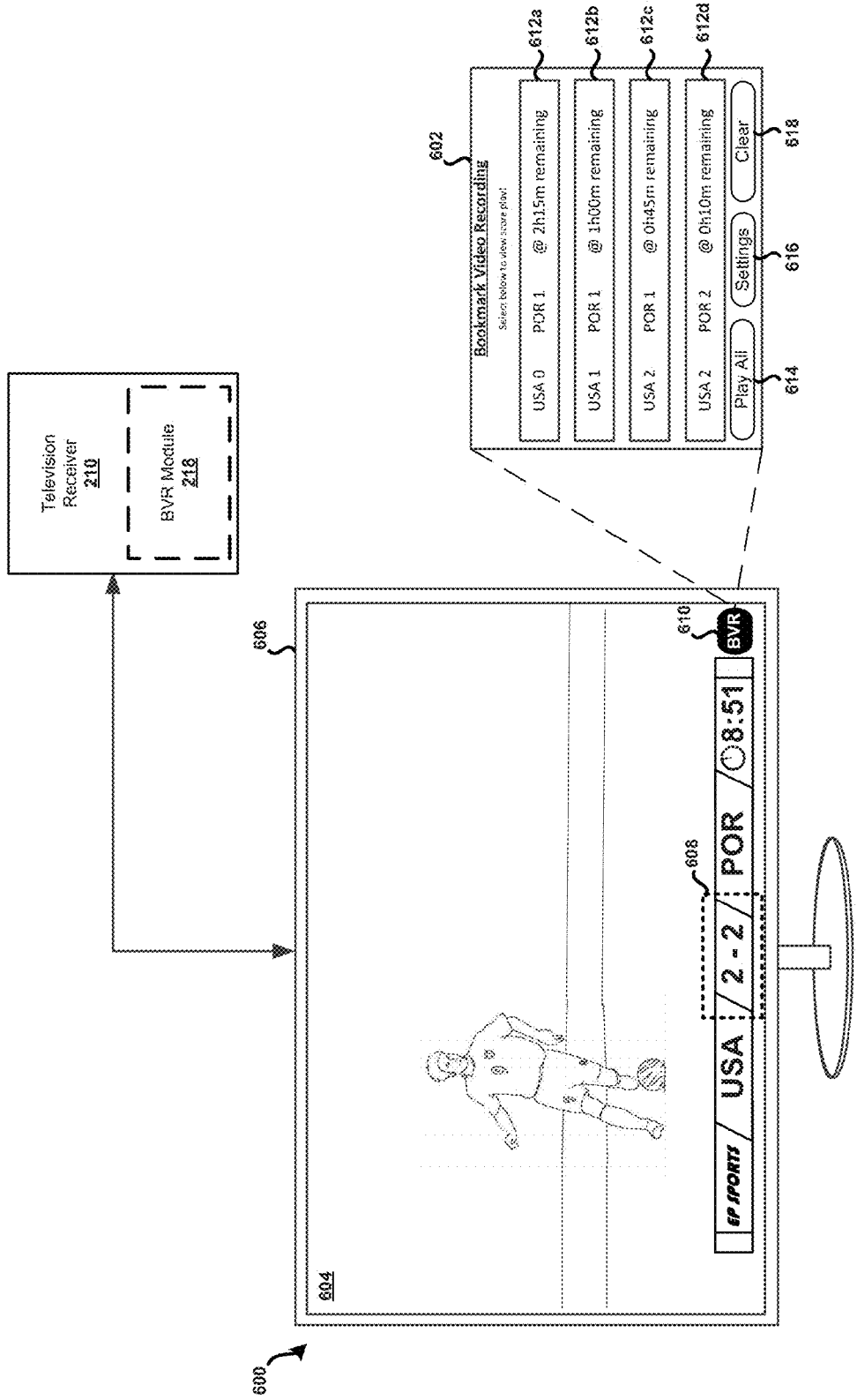
FIG. 6 shows an example user interface including a bookmarks display according to the present disclosure.

Turning to FIG. 6, an example user interface 600 including a bookmarks display 602 is shown. It is contemplated that the user interface 600 and/or the bookmarks display 602 may be provided on a display screen 604 of a display device 606, which may be operatively connected to the television receiver 210 and/or the BVR module 218 thereof. An example soccer game is output for presentation on the display device 606. A monitoring location 608 is indicated in a dashed rectangular region to include a score display. It is contemplated that the video segment providing for characters and/or data within this monitoring location 608 is utilized for OCR. Further, a BVR icon 610 is provided to indicate that the soccer game output for presentation is being monitored for bookmark video recording. In some examples, the BVR icon 610 may change color when a particular portion shown is actively being recorded and/or bookmarked. In other examples, the BVR icon 610 may be selectable and open up to the bookmarks display 602.

In the example bookmarks display 602, a listing of the bookmarks 612a-d may be provided and selectable. For example, each bookmarked trigger event may be indicated by a button or bar and may include a brief description of the trigger event and/or other relevant information detected at the time of bookmarking, e.g. the score display and/or the time remaining. In other examples, a screenshot of the video segment and/or an entire display screen taken at the time of detecting the bookmark may be shown and/or provided as a background to each bookmark bar. The bookmarks display 602 may permit a user to scroll up and down through the listing of bookmarks 612a-d to select one or more trigger events for viewing. In another example, the user may select a play all button 614 to play all bookmarked recordings. Other buttons may be provided, such as a settings button 616 to access setup procedures and/or a clear button 618 to clear the bookmarked events and/or erase the recordings from the television receiver. Numerous other buttons may be displayed. In other aspects, it is contemplated that the bookmarks display 602 may be a transparent overlay across all or a portion of the display screen 604, and/or provided toward a left or right side of the display screen 604, which may cause an area of the soccer game being output to condense and/or shift toward an opposite side of the screen 604. In that case, the television receiver may determine a new monitoring location based on a shifted position of the score display. Other examples are possible.

In still another example, bookmarked video segments of live and/or pre-recorded media content may be accessed by skipping through the bookmarks. For instance, a user may select a first bookmark to output the first bookmarked event to the display screen. The first bookmarked event may include a buffer portion preceding an exciting, trigger portion, the trigger portion, and/or a trailing portion such as a post-play analysis. In some cases, the user may continue to view media content immediately following the trailing portion, for instance, if the media content is a pre-recorded media content and/or an entire recording of the television broadcast. The user may also fast-forward and/or rewind within bookmarked portions. Once the user is done viewing the first bookmarked portion, the user may skip ahead to a second bookmarked portion by inputting a skip forward command. In response, the television receiver may output the second bookmarked portion starting at a buffer portion thereof, and/or ending with a trailing portion. Similarly, the user may continue watching past the trailing portion if that portion of the video is available for viewing. It is contemplated that the user may easily skip through, forward and/or backward, a plurality of bookmarked media segments.

Figure 7:
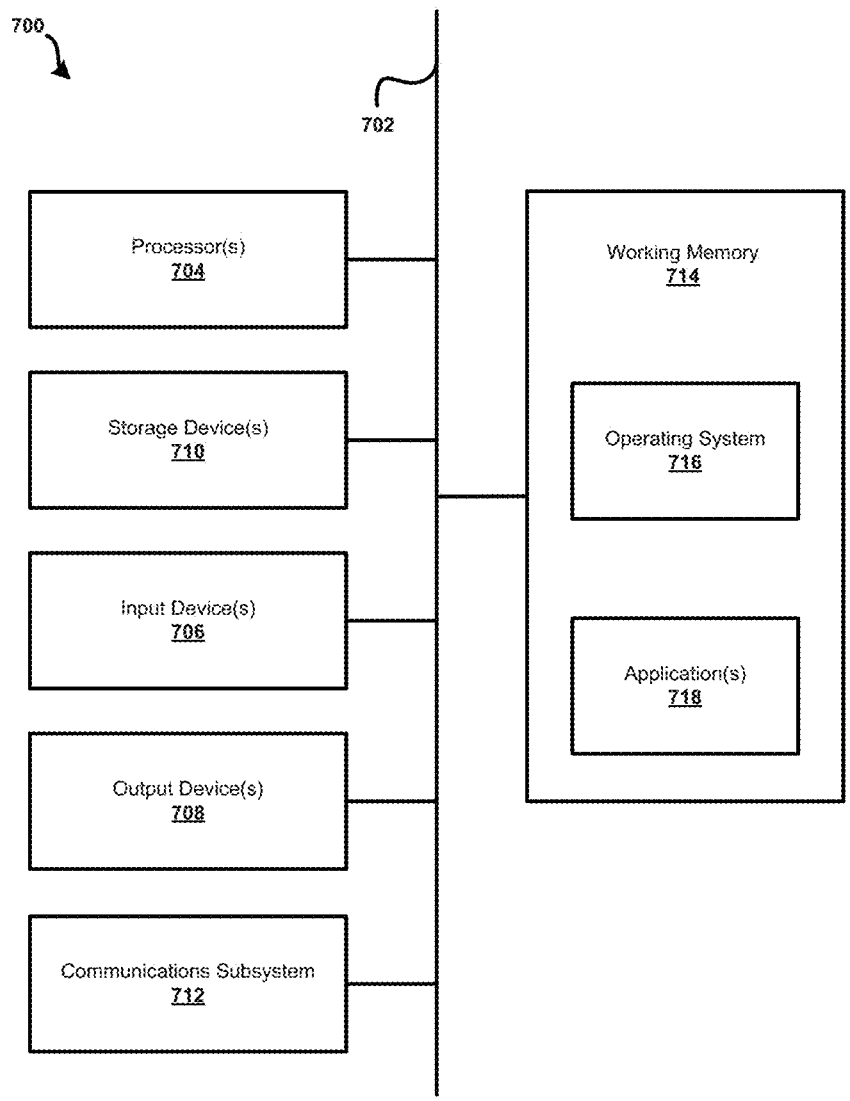
FIG. 7 shows an example block diagram for a computing system upon which various features of the present disclosure may be provided.

Turning now to FIG. 7, an example block diagram for a computer system or device 700 upon which various features of the present disclosure may be provided is shown. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 700, such as any of the respective elements of at least FIG. 2 and FIG. 3. In this manner, any of one or more of the respective elements of at least FIG. 2 and FIG. 3 may be configured to perform and/or include instructions that, when executed, perform the methods of FIG. 1, FIG. 4, and/or FIG. 5. Still further, any of one or more of the respective elements of at least FIG. 1 may be configured to perform and/or include instructions that, when executed, instantiate and implement functionality of the PTR 210 and/or the server(s).

The computer device 700 is shown comprising hardware elements that may be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which may include without limitation a remote control, a mouse, a keyboard, and/or the like; and one or more output devices 708, which may include without limitation a presentation device (e.g., television), a printer, and/or the like.

The computer system 700 may further include (and/or be in communication with) one or more non-transitory storage devices 710, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 700 might also include a communications subsystem 712, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 712 may permit data to be exchanged with a network (such as the network described below, to name one example), other computer systems, and/or any other devices described herein. In many embodiments, the computer system 900 will further comprise a working memory 714, which may include a random access memory and/or a read-only memory device, as described above.

The computer device 700 also may comprise software elements, shown as being currently located within the working memory 714, including an operating system 716, device drivers, executable libraries, and/or other code, such as one or more application programs 718, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 700) to perform methods in accordance with various embodiments of the disclosure. According to a set of embodiments, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 710. Volatile media may include, without limitation, dynamic memory, such as the working memory 714.

Example forms of physical and/or tangible computer-readable media may include a floppy disk, a flexible disk, hard disk, magnetic tape, or any other magnetic medium, a compact disc, any other optical medium, ROM, RAM, and etc., any other memory chip or cartridge, or any other medium from which a computer may read instructions and/or code. Various forms of computer-readable media may be involved in carrying one or more sequences of one or more instructions to the processor(s) 704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704.

It should further be understood that the components of computer device 700 can be distributed across a network. For example, some processing may be performed in one location using a first processor while other processing may be performed by another processor remote from the first processor. Other components of computer system 700 may be similarly distributed. As such, computer device 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for selectively recording a portion of broadcast media content, comprising:
    receiving, by a television receiver, a video stream containing the broadcast media content, wherein the video stream is received via a tuner of the television receiver;
    determining, by the television receiver, a video segment of the video stream to be output to a display device;
    performing, by the television receiver, OCR on characters present within the video segment;
    detecting, by the television receiver, a trigger event based on the OCR of the video segment, wherein the trigger event comprises an identified change detected in the OCR of the video segment;
    after detecting the trigger event, creating, by the television receiver, a digital bookmark corresponding to the trigger event being detected;
    in response to detecting the trigger event, generating, by the television receiver, a recording of a portion of the broadcast media content, wherein the recording of the portion of the broadcast media content begins prior to the trigger event and concludes after the trigger event;
    detecting, by the television receiver, a break in the video segment, wherein detecting the break includes detecting a change in a content type of the video segment;
    pausing, by the television receiver, the OCR on the video segment upon detecting the break;
    pausing, by the television receiver, the recording of the portion of the broadcast media content upon detecting the break;
    detecting, by the television receiver, an end of the break;
    after determining the break has ended, resuming, by the television receiver, the recording of the portion of the broadcast media content;
    after resuming the recording of the portion of the broadcast media content, resuming the OCR on the video segment; and
    storing, by the television receiver, the generated recording and the digital bookmark associated with the generated recording.

2. The method for selectively recording the portion of broadcast media content of claim 1, comprising:
    determining, by the television receiver, an availability status of the tuner for receiving the video stream for OCR; and
    dedicating, by the television receiver, the tuner for receiving the video stream containing the broadcast media content for OCR.

3. The method for selectively recording the portion of broadcast media content of claim 1, comprising:
    outputting, by the television receiver, the video segment at a monitoring location of a display screen on the display device.

4. The method for selectively recording the portion of broadcast media content of claim 1, comprising:
    receiving, by the television receiver, user input for specifying a monitoring location of a display screen on the display device; and
    determining, by the television receiver, the video segment of the video stream for OCR based on the specified monitoring location.

5. The method for selectively recording the portion of broadcast media content of claim 1, comprising:
    wherein the video stream comprises a sports competition,
    wherein the video segment comprises a score display,
    wherein the characters comprise a score of the sports competition, and
    wherein the identified change comprises a change in the score of the sports competition.

6. The method for selectively recording the portion of broadcast media content of claim 5, comprising:
    distinguishing, by the television receiver, the score from other data in the video stream to determine the video segment, wherein the other data comprises numerical values.

7. The method for selectively recording the portion of broadcast media content of claim 6, comprising:
    wherein the other data comprises at least one of a time remaining and a game interval of the sports competition.

8. The method for selectively recording the portion of broadcast media content of claim 1, comprising:
    continuously performing, by the television receiver, OCR on the characters present within the video segment at predetermined time intervals throughout a broadcast time of the broadcast media content.

9. The method for selectively recording the portion of broadcast media content of claim 1, comprising:
    wherein the break in the video segment comprises one or more commercial events.

10. The method for selectively recording the portion of broadcast media content of claim 1, comprising:

receiving, by the television receiver, user input for defining the trigger event to detect in the OCR of the video segment.

11. The method for selectively recording the portion of broadcast media content of claim 10, comprising:
receiving, by the television receiver, user input for selecting a category type of the broadcast media content for OCR;
identifying, by the television receiver, that the video stream matches the selected category type; and
monitoring, by the television receiver, the video stream for the user-defined trigger event.

12. The method for selectively recording the portion of broadcast media content of claim 1, comprising:
inserting, by the television receiver, the digital bookmark at a position in a file of the video stream, wherein the position is based on a location of the detected trigger event in the file.

13. The method for selectively recording the portion of broadcast media content of claim 1, comprising:
receiving, by the television receiver, user input for selecting a first time duration for storing a buffer portion of the video stream prior to the detected trigger event, wherein a length of the buffer portion is based on the first time duration.

14. The method for selectively recording the portion of broadcast media content of claim 1, comprising:
receiving, by the television receiver, user input for selecting a second time duration for recording a trailing portion of the video stream immediately following the detected trigger event, wherein a length of the recorded trailing portion is based on the second time duration.

15. The method for selectively recording the portion of broadcast media content of claim 1, comprising:
recording, by the television receiver, the video stream for a duration of a broadcast time of the broadcast media content; and
creating, by the television receiver, a plurality of digital bookmarks marking a plurality of trigger events detected in the recorded video stream.

16. The method for selectively recording the portion of broadcast media content of claim 1, comprising:
outputting, by the television receiver, a bookmark display for the digital bookmark on the display device, wherein the bookmark display is configured to receive user input for selecting the digital bookmark and displaying the recording.

17. A non-transitory computer-readable medium having stored thereon a series of instructions which, when executed by a processor, cause the processor to selectively record a portion of broadcast media content by:
receiving, by a television receiver, a video stream containing the broadcast media content, wherein the video stream is received via a tuner of the television receiver;
determining, by the television receiver, a video segment of the video stream to be output to a display device;
performing, by the television receiver, OCR on characters present within the video segment;
detecting, by the television receiver, a trigger event based on the OCR of the video segment, wherein the trigger event comprises an identified change detected in the OCR of the video segment;
after detecting the trigger event, creating, by the television receiver, a digital bookmark corresponding to the trigger event being detected;
after detecting the trigger event, generating, by the television receiver, a recording of a portion of the broadcast media content, wherein the recording of the portion of the broadcast media content begins prior to the trigger event and concludes after the trigger event;
detecting, by the television receiver, a break in the video segment, wherein detecting the break includes detecting a change in a content type of the video segment;
pausing, by the television receiver, the OCR on the video segment upon detecting the break;
pausing, by the television receiver, the recording of the portion of the broadcast media content upon detecting the break;
detecting, by the television receiver, an end of the break;
after determining the break has ended, resuming, by the television receiver, the recording of the portion of the broadcast media content;
after resuming the recording of the portion of the broadcast media content, resuming the OCR on the video segment; and
storing, by the television receiver, the generated recording and the digital bookmark associated with the generated recording.

18. A system for selectively recording a portion of broadcast media content, comprising:
one or more processors; and
a memory communicatively coupled with and readable by the one or more processors and having stored therein processor-readable instructions that, when executed by the one or more processors, cause the one or more processor to:
receive, by a television receiver, a video stream containing the broadcast media content, wherein the video stream is received via a tuner of the television receiver;
determine, by the television receiver, a video segment of the video stream to be output to a display device;
perform, by the television receiver, OCR on characters present within the video segment;
detect, by the television receiver, a trigger event based on the OCR of the video segment, wherein the trigger event comprises an identified change detected in the OCR of the video segment;
after detecting the trigger event, create, by the television receiver, a digital bookmark corresponding to the trigger event being detected;
after detecting the trigger event, generate, by the television receiver, a recording of a portion of the broadcast media content, wherein the recording of the portion of the broadcast media content begins prior to the trigger event and concludes after the trigger event;
detect, by the television receiver, a break in the video segment, wherein detecting the break includes detecting a change in a content type of the video segment;
pause, by the television receiver, the OCR on the video segment upon detecting the break;
pause, by the television receiver, the recording of the portion of the broadcast media content upon detecting the break;
detect, by the television receiver, an end of the break;
after determining the break has ended, resume, by the television receiver, the recording of the portion of the broadcast media content;
after resuming the recording of the portion of the broadcast media content, resume the OCR on the video segment; and store, by the television receiver, the generated recording and the digital bookmark associated with the generated recording.

19. A method for bookmarking media content, comprising:
   determining, by a television receiver, a portion of the media content to monitor for a trigger event;
   monitoring, by the television receiver, the determined portion of the media content for the trigger event;
   detecting, by the television receiver, the trigger event in the media content;
   after detecting the trigger event, creating, by the television receiver, a digital bookmark corresponding to the trigger event being detected;
   detecting, by the television receiver, a break in the portion of the media content, wherein detecting the break includes detecting a change in a content type of the portion of the media content;
   pausing, by the television receiver, the media content upon detecting the break;
   detecting, by the television receiver, an end of the break;
   after determining the break has ended, resuming, by the television receiver, the portion of the media content; and
   resuming, by the television receiver, monitoring the determined portion of the media content for additional trigger events.

20. The method for bookmarking media content of claim 19, comprising:
   wherein the determined portion of the media content to monitor comprises closed-caption data of the media, and
   wherein the trigger event comprises one or more keywords detected in the closed-caption data.

21. The method for bookmarking media content of claim 19, comprising:
   wherein the determined portion of the media content to monitor comprises a video segment of the media content being output to a display screen operatively connected to the television receiver, and
   wherein detecting the trigger event comprises detecting a change in the video segment based on an OCR of the video segment.

22. The method for bookmarking media content of claim 19, comprising:
   wherein the media content is a pre-recorded media content; and
   wherein the digital bookmark is added to a digital bookmarks file and points to a location of the trigger event in the pre-recorded media content.

23. The method for bookmarking media content of claim 19, comprising:
   after detecting the trigger event, creating, by the television receiver, a recording of the trigger event being detected, wherein the recording begins prior to the trigger event and concludes after the trigger event.

* * * * *